E. C. FOLSOM.
OVERHEAD TROLLEY SWITCH.
APPLICATION FILED DEC. 14, 1908.
921,217.
Patented May 11, 1909.
2 SHEETS—SHEET 1.
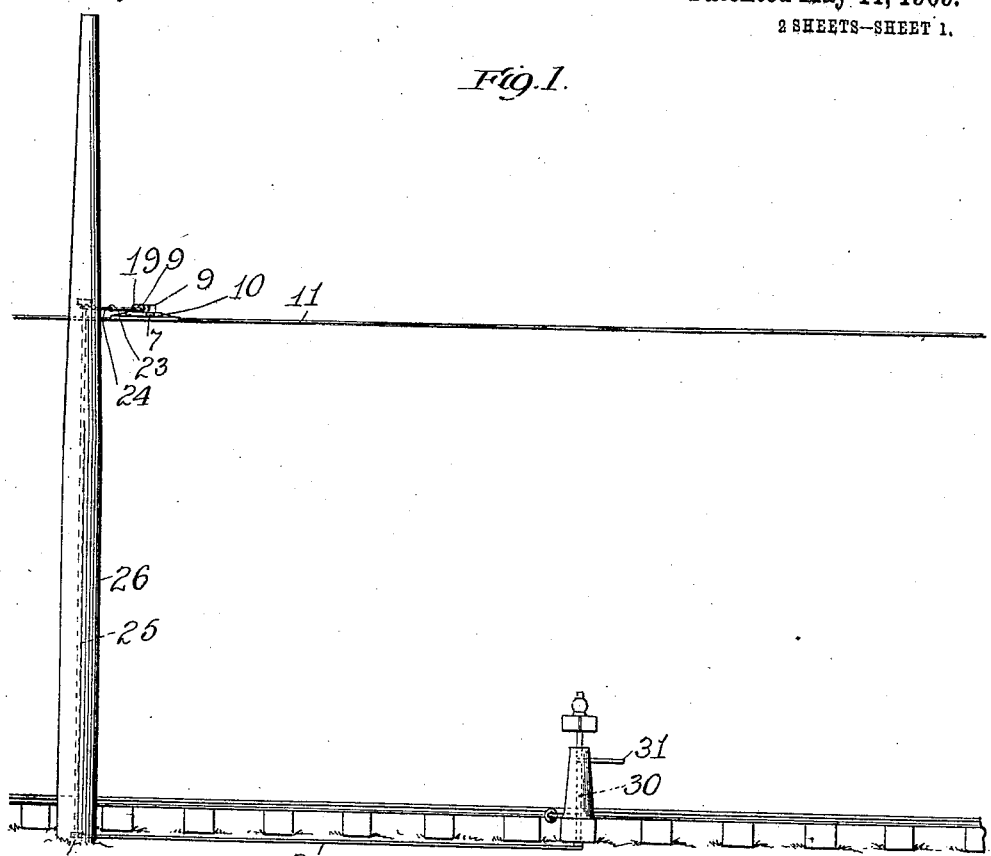
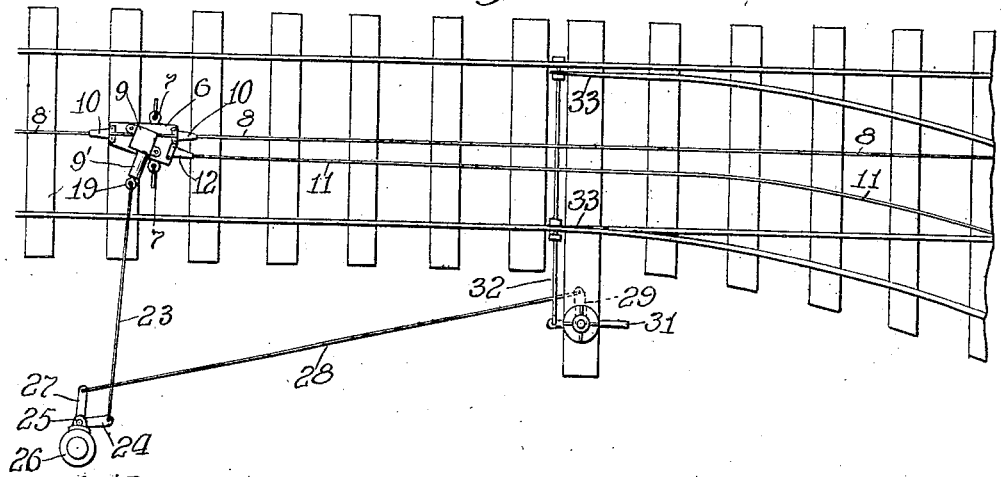

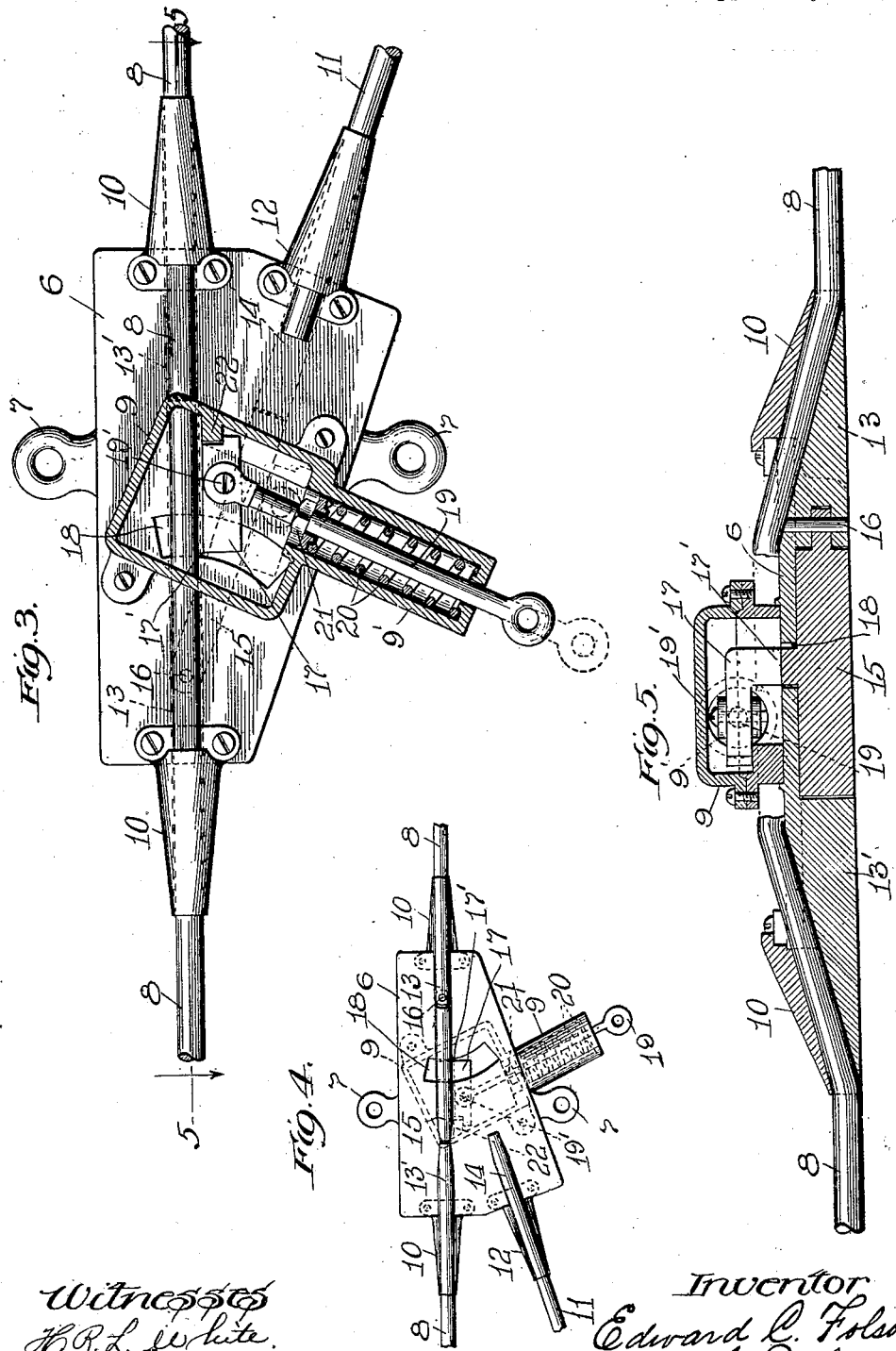

UNITED STATES PATENT OFFICE.

EDWARD C. FOLSOM, OF LOGANSPORT, INDIANA, ASSIGNOR OF ONE-THIRD TO WILLIAM M. SIMPSON, OF CHICAGO, ILLINOIS, AND ONE-THIRD TO JAMES J. BRENNAN, OF FORT WAYNE, INDIANA.

OVERHEAD-TROLLEY SWITCH.

No. 921,217.   Specification of Letters Patent.   Patented May 11, 1909.

Application filed December 14, 1908. Serial No. 467,438.

*To all whom it may concern:*

Be it known that I, EDWARD C. FOLSOM, a citizen of the United States, residing at Logansport, in the county of Cass and State of Indiana, have invented new and useful Improvements in Overhead-Trolley Switches, of which the following is a specification.

The object of this invention is to provide an overhead trolley switch with a movable member adapted to be operated simultaneously with the track switch to guide the trolley wheel across the switch to the main line trolley wire or to the switch trolley wire.

The invention has other objects in view which will be pointed out hereinafter in the detail description of the invention as it is embodied in the accompanying drawings, referring to which—

Figure 1 is an elevation and Fig. 2 a top plan view showing the invention applied to a section of a trolley line. Fig. 3 is a top plan view of the trolley switch shown partly in section. Fig. 4 is a bottom plan view of the trolley switch. Fig. 5 is a longitudinal sectional view on the line 5—5 of Fig. 3.

Referring to the drawings and particularly to Figs. 3–5, 6 designates the base or contact plate provided with the usual ears 7 to which the guy or supporting wires are attached. The main line trolley wire 8 passes over the top of the plate 6 and through the casing 9 thereon and is fastened to said plate by clamps 10 of any suitable construction. The switch track line trolley wire 11 is fastened to the plate by a clamp 12. The plate is provided on its underside with ribs 13, 13' and 14 and the movable member 15 is pivotally mounted on a pin 16 at the inner end of the rib 13. This movable member is adapted to swing on its pivot into alinement with the rib 13' or the rib 14 to form a continuous guide for the trolley wheel from the rib 13 to the rib 13' to continue the wheel on the main trolley wire, or to the rib 14 to direct the wheel to the switch trolley wire. The movable member 15 has a bent arm 17 which projects up through an opening 18 in the base plate. In the construction illustrated this arm extends up from the top of the movable member and is offset at 17' to clear that part of the main line trolley wire which extends across the base plate. Thus the movable member 15 may lie directly beneath the wire 8 to form a continuation of the trolley wheel guide constituted by the ribs 13 and 13', while the arm 17 will lie alongside of the wire 8. A rod 19 is pivotally connected at 19' to the arm 17 and it projects outward through an extension 9' of the casing 9. A spring 20 is arranged on the rod 19 within said extension 9' and is confined between the end of said extension and an adjustable stop 21 on the rod. This spring operates by expansion on the rod 19 to hold the arm 17 against the stop 22 and the movable member 15 in alinement with the ribs 13, 13'. The rod 19 is suitably connected with the track switch so that the movable member 15 will be shifted simultaneously with the track switch. When the switch is thrown to direct a car to the switch track the movable member will be shifted at the same time to aline with the rib 14, and when the switch is thrown to direct a car on the main track the movable member 15 will be returned to the position illustrated in alinement with the rib 13'.

The movable member of the trolley switch may be connected with the track switch in any suitable manner and in Figs. 1 and 2 I have shown the rod 19 connected by a rod 23 with a crank arm 24 on a rock shaft 25 suitably mounted on a post or pole 26. A crank arm 27 on the rock shaft is connected by a rod 28 to a crank arm 29 on the shaft 30 of the switch stand. This switch stand shaft is operated in any suitable manner, as by a lever 31 and it is connected by a rod 32 with the switch points 33. I may use any other suitable means for connecting the trolley switch and the track switch, it being essential to my invention only that the trolley switch should be operated simultaneously with the track switch. Other means for connecting the movable member with the track switch may be employed as required to adapt the invention for existing conditions. I prefer to provide rod connections instead of cables to avoid slack, but arrangements may be made for using cables, if desired. The spring is constantly pressing on the arm of the movable member to return said member to its normal position in alinement with the main trolley line ribs 13, 13'.

What I claim and desire to secure by Letters Patent is:

1. A trolley switch comprising a base plate, means on said plate for connecting electric conductors thereto, ribs on the underside of said plate to form guides for the trolley wheel, a movable member mounted on said plate to aline with one rib and either of the other ribs, said plate having an opening therein, a casing on the plate over said opening, an arm on the movable member extending through said opening into the casing, a rod connected to said arm, a stop on said rod, a spring on the rod within the casing and confined between the end of the casing and said stop, and means connected with said rod for operating said member.

2. A trolley switch comprising a base plate having an opening therein, a casing on the plate above said opening, a main line trolley wire extending across the plate and through said casing, a switch track trolley wire ending at the plate, clamps for securing the main line and switch track trolley wires to the plate, ribs on the underside of the plate in alinement with said wires, said ribs being separated from each other, a movable member mounted on said plate to aline with one rib and either of the other ribs, an arm on said movable member projecting up through said opening into the casing, said arm being offset to clear the main line trolley wire when the movable member is alined with the ribs beneath said main line trolley wire, and means for operating said member.

3. A trolley switch comprising a base plate, means on said plate for connecting electric conductors thereto, ribs on the underside of said plate to form guides for the trolley wheel, a movable member pivotally mounted at one end on said plate and alining at its pivot with one rib and adapted to aline at its free end with either of the other ribs, a casing projecting laterally from the plate, an arm connected to said movable member, a spring inclosed within said casing and operating on said arm to hold the movable member with its free end alined with one rib, and means for swinging said movable member against said spring pressure into alinement with the other rib.

EDWARD C. FOLSOM.

Witnesses:
 WM. O. BELT,
 M. A. KIDDIE.